United States Patent
White et al.

(10) Patent No.: US 8,644,606 B2
(45) Date of Patent: Feb. 4, 2014

(54) METHOD FOR VISUAL IMAGE DETECTION

(76) Inventors: Steven White, Anna, TX (US); Ashok Ramadass, Richardson, TX (US); Dilip Raghavan, Richardson, TX (US)

(*) Notice: Subject to any disclaimer, the term of this patent is extended or adjusted under 35 U.S.C. 154(b) by 95 days.

(21) Appl. No.: 13/374,937

(22) Filed: Jan. 24, 2012

(65) Prior Publication Data

US 2012/0224769 A1  Sep. 6, 2012

Related U.S. Application Data

(60) Provisional application No. 61/461,730, filed on Jan. 24, 2011.

(51) Int. Cl.
*G06K 9/00* (2006.01)

(52) U.S. Cl.
USPC .................. 382/165; 382/149; 382/162

(58) Field of Classification Search
USPC .......... 382/162, 165, 141, 149; 340/988, 990; 356/394, 237.1; 250/203.6, 231.12; 701/494

See application file for complete search history.

(56) References Cited

U.S. PATENT DOCUMENTS

| | | | | |
|---|---|---|---|---|
| 5,642,106 A * | 6/1997 | Hancock et al. | ............ | 340/988 |
| 5,964,571 A * | 10/1999 | Braner et al. | ............ | 414/792.7 |
| 6,630,998 B1 * | 10/2003 | Welchman et al. | ............ | 356/394 |
| 6,809,822 B2 * | 10/2004 | Welchman et al. | ............ | 356/394 |
| 6,825,931 B2 * | 11/2004 | Welchman et al. | ............ | 356/394 |
| 6,839,138 B2 * | 1/2005 | Welchman et al. | ............ | 356/394 |

\* cited by examiner

*Primary Examiner* — Anh Do
(74) *Attorney, Agent, or Firm* — Thrasher Associates

(57) ABSTRACT

The method uses several steps to collect, analyze, compare, and flag an image for inappropriate content. The image is first collected based on detection and is analyzed via a database of inappropriate images. The collected image is scanned for skin-tone and/or texture, then the method eliminates the background of the image. The method then analyzes the curvature of the image. The next step is body part detection for inappropriate body parts. The image is then given a score based on all of the above steps. If the score is above a point, the image is flagged. If it is below a preselected point, the image is released. If the score is between the two points, it is withheld for further analysis.

18 Claims, 3 Drawing Sheets

METHOD FOR VISUAL IMAGE DETECTION

CLAIM OF PRIORITY

This Application claims priority to U.S. Provisional Patent Application No. 61/461,730 to common inventor White, dated 24 Jan. 2011 and entitled Visual Streaming Image Recognition.

FIELD OF INVENTION

The present invention relates generally to digital image detection methods.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

The expansion of the abilities of the internet and wireless technology has increased the transfer of information and data through the internet. This data can include inappropriate material. Inappropriate material is defined by the user, but can include obscene visual images the receiver does not want to see. These pictures can include obscene, even illegal images. Additionally, parents frequently want to limit the access of their children when using their computers. Similarly, website operators want to limit the pictures that are posted on their website to images that are neither obscene or offensive.

Furthermore, there has been an increase in distributing inappropriate material including copyrighted and/or trademarked material. The illegal distribution of copyrighted material has become such a problem that the legislators have tried to draft additional legislation to minimize this distribution including the Stop Online Piracy Act (SOPA).

Existing blocking methods are time consuming, lack reliability, are easily circumvented, and often require many man hours to review the results. Accordingly, there is a need for improved methods to detect images. This invention is such a method.

BRIEF DESCRIPTION OF THE DRAWINGS

Various aspects of the invention, as well as an embodiment, are better understood by reference to the following detailed description. To better understand the invention, the detailed description should be read in conjunction with the drawings and tables, in which.

EXEMPLARY EMBODIMENT OF A BEST MODE

Interpretation Considerations

Figure 1:
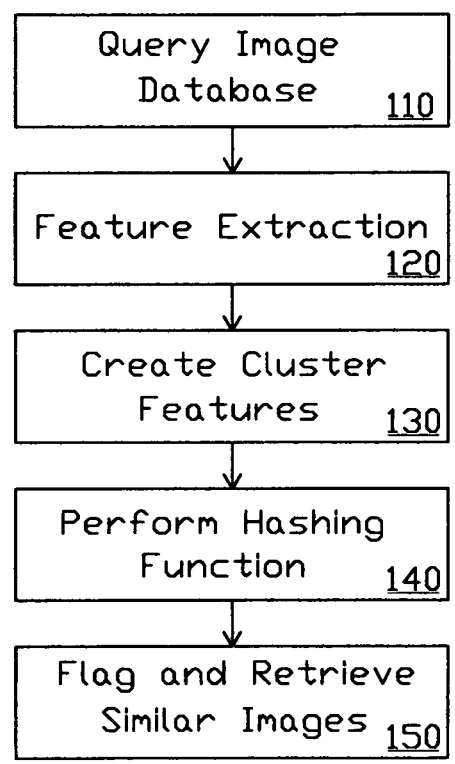
FIG. 1 is a flow chart of each of the steps of hashing value computation process.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for —functioning—" or "step for —functioning—" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise.

DESCRIPTION OF THE DRAWINGS

The method for image selection is a thorough process analyzing the image and its individual parts. When an image is analyzed, it is given a unique identification as its key. Feature descriptors are then chosen for the image by a computerized scan and then selected via a computer readable medium. The number of feature descriptors varies amongst images. In a key table, each feature descriptor is given a unique identification and the descriptor's corresponding file identification is used as a foreign key. 10 hash values are then computed for each feature descriptor of the image. A bucket then contains a bucket identification value, the feature descriptor identification value, and its corresponding hash value.

Shown in FIG. 1 is the process for visual image detection. This method can be performed on a computer readable medium from a web based portal. The process can scan for specific images including nudity, trademarks, copyrighted material, and textual material in an image format. The process increases the efficiency off scanning images for inappropriate material and/or infringing content. The first step is querying the image database 110, inputting images.

The process of selecting these feature point descriptors is the feature extraction step 120. The feature extraction step is the selection of the feature points described above. These points given values, descriptors, and will be used for calculations for the fast and sift algorithms to increase efficiency of searching images. The fast algorithm extracts the feature points from the image and omits all of the edge features, but includes all of the corner features. Then the sift algorithm computes descriptor values for all of the extracted features from the fast algorithm.

Feature descriptors are then clustered 130 into a range between 0 and 128 values. The K-means array is used for the clustering 130. Following the clustering, the final hash value descriptors 140 are computed. For all of the features, a unary feature of each of the descriptors of the feature is computed. The total number of descriptors for a feature is 128, but the total number of features per image can vary. There are 128 descriptors of value ranging between 0 and 128. After computing the unary features, the result will be a square matrix with a dimension 128×128.

Twenty random projection values correspond to 20 hash functions that have been computed from the example image. Random projections are chosen to take into account that the maximum number of squares out of a 128×128, but with less collisions. Each random projection outputs the 36 bit hash value 150. Images with the same 36 bit hash value are selected as matches 150. The result is a 36×20 has value for each individual feature. For all of the features, the 36×20 values are computed into 20 corresponding buckets.

For the retrieval of similar images 150, hashing values are calculated for each new input image. Every feature of a queried image for which the 36×20 bit hash value is computed. Each of the 36 bits hash value is searched for a match in the corresponding bucket. The queried feature is defined as a matching feature in the database only if the number of matches per 20 buckets crosses a predetermined threshold. If the threshold is preselected as 10, then for a feature to be a match; there should be matches for the 36 bit hash values in at least 10 of the 20 buckets. The threshold allows for user to adjust sensitivity to reduce false positives, but select all possible matching images. This process is performed for each image that is added to the database for detection purposes.

The benefits the process over prior art are increased efficiency and the ability to detect matches of images despite alternative image orientations. For example, if a building corner photo is taken from a zero degree and another photo of the image from a 30 degree angle, the process still determines the images to be a match.

Figure 2:
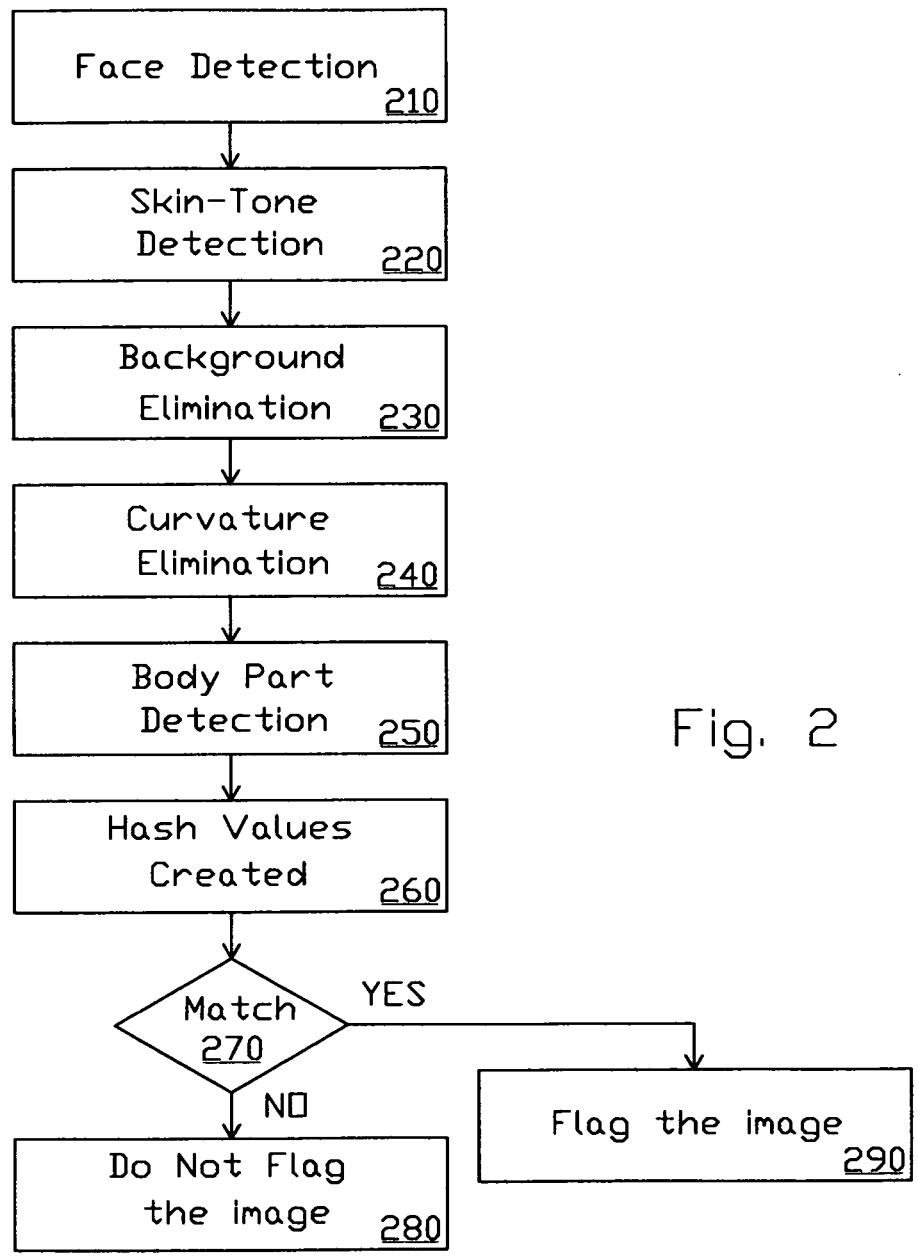
FIG. 2 is a flow chart of the image selection method.

If the image is a match, it moves onto the next step. Shown in FIG. 2 is the image selection process, the user selects an image as the basis for detection. For each step in FIG. 2, the process in FIG. 1 is performed. For nudity detection, the database will need to be supplied with multiple example nudity images for the process to use for comparison and selection basis. Each image that is used in this database runs through the process first. By running these images through the process, the user is teaching the computer readable medium to identify future images.

For the process shown in FIG. 2, there are two ways for an image to be selected as a match. The first would be a cumulative match where the new image needs to match a cumulative number of buckets for the entire process. The second would be that the image needs to match a number of buckets for each individual feature in each individual step.

After the computer readable medium is trained and a threshold established, a new image is run through the process for each of the steps shown in FIG. 2. First, the new image scanned for various points of interest, designated as feature points. For example, if the process is searching for inappropriate images, the method would utilize shape configurations.

The first step would be the facial detection 210. There are common shape configurations that make up a face, the eyes and location relation and a nose and mouth that all make up shapes and have a relationship to each other. When searching for a face, the shapes must maintain the relationship to be picked up by the scan. A nose needs to be between the eyes and mouth. The eyes cannot have a mouth between them. If the image has these points, an area of interest is selected and is given feature point descriptor values for these shapes and edges going forward for the process.

The process can work for specific images such as a copyright or trademark. The facial discovery step for these images would be selecting the area of interest based on common shapes in the trademark or copyright. For example, the Nike® trademark is the swoosh emblem. The process would scan for the points that make up the tips of the logo and the index convex points and their relationship to each other. If a match is detected, the area of interest would be the area surrounding these shapes and the shapes and edges would be selected as the feature point descriptors.

The next step of the process is skin tone detection 220. Skin tone detection 220 is just color detection where color ranges are selected from the color spectrum to be used for matching purposes. For nudity images, the colors would be the human colors of skin. This works for color images but not black and white images. For black and white images, levels of shading would be selected. In addition to color selection, the pixel intensity is used for color determination purposes. If the intensity of the pixels and the color match are selected from the database images for matches. The features established for the facial, image detection are the scanned section of the image for the color matching step and areas surrounding the facial features.

After the skin tone detection step 220 is performed, the background elimination step 230 is performed. Any area of the image that has not matched on the facial feature detection step and/or the skin tone detection step, that area will be negated in future scanning for the following steps. The background elimination step increases the efficiency at which the future steps are performed.

Following the background elimination step 230, the curvature elimination step 240 is performed. This step monitors the edge features for the edges of the skin-tone detection 220 and the facial detection 210. If these edges are jagged or determined to be inhuman or not a match of the image, then those areas are eliminated as possible matches going forward.

The feature areas that have not been eliminated are now scanned for the body part detection step 250. The images used to train the computer readable medium are utilized for this step. The hashing function used in FIG. 1 is important for this specific step. All of the previous steps of the process in FIG. 2 can be done without the process in FIG. 1. The body part detection 250 utilizes the hashing value process of FIG. 1 for efficiency and performance purposes. The process of FIG. 1 minimizes false positives while capturing a high percentage of matches. This step can be performed for body part matches, textual matches, trademark matches, and/or copyrighted material matches.

The process of FIG. 1 is performed on the feature points that have not been eliminated for the body detection step 250. The body part detection would scan for the groin (genitalia) and the chest (breast) similarities compared to images in the database. The hash values are determined 260 for the feature points for descriptor values. The resulting buckets are compared with those saved in the database for the search. The match decision 270 is determined based on the buckets resulting from step 260 and the buckets of the example images in the database. If the image does not match the prerequisite number of buckets, the image is release and not flagged 280. If the image is a match, then it is flagged 290 for selection.

Figure 3:
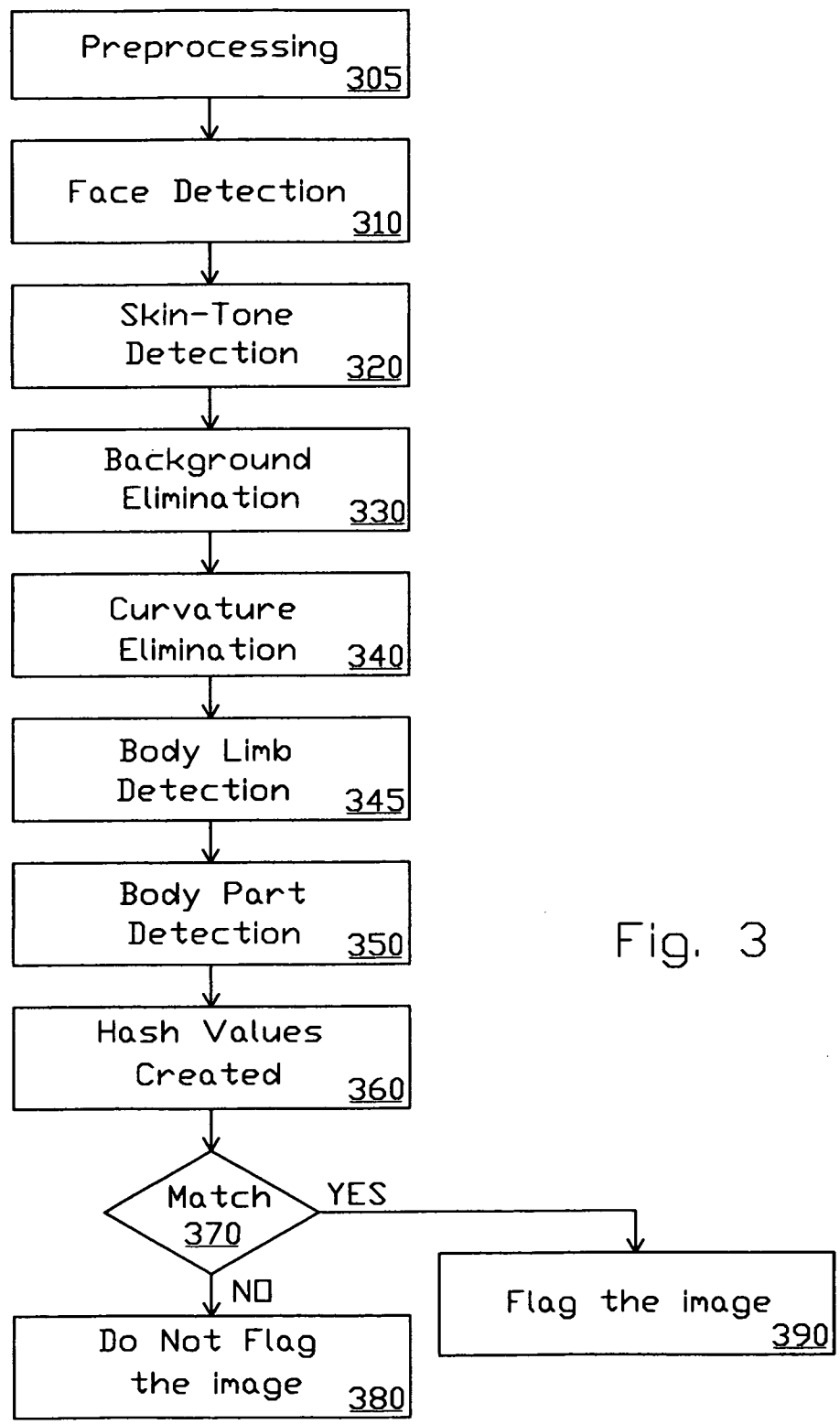
FIG. 3 is a flow chart of the image selection method with additional steps.

FIG. 3 shows a similar process as FIG. 2, except additional steps have been added to increase reliability for nudity detection. This process has the face detection 310, the skin-tone detection 320, background elimination 330, and curvature elimination 340 steps, but adds the image preprocessing step 305 and the body limb detection step 345. The image preprocessing step 305 is increases the efficiency of the process.

The image preprocessing step 305 includes bilateral filtering and edge mapping. Bilateral filtering step 305 works to smoothen the input image. Unlike alternative filtering methods, bilateral filtering does not blur the edges of the image. Edge mapping is where the input image is scanned and edge points are selected based on high gradients. These points are marked. These points are scanned for flood fill and bounding boxes are determined. Not every edge point is selected, but a traverse of every four (4) bounding boxes is determined. The properties checked are width to height ratios and height of the bounding box. Thresholds can be established for criteria before imputing noncomplying images.

The body limb detection step 345 uses the curvature features that have not been eliminated. The curvature features are used to for similar curvature basis in the database. A human leg has limited possibilities of curvature for its edges. The impossible edges have already been eliminated, but the limb detection is used for determination of a smaller amount of image features that need to be used for the body part detection step 350. For example, when the curvature edges are farther apart at one end, that end would be determined as the possible top of the leg or the groin area. If it was the larger part of an arm, it would be near the chest area. By limiting the possible areas for locations of inappropriate nudity areas such as the chest and groin, the body part detection 350 can be performed with higher efficiency and reliability.

After the body limb detection step 345, the body part detection step 350, the hash determination step 360 and the match decision 370 can be performed much more quickly. By reducing the amount of features that need to be hash calculated 360, the process works much more efficiently. The body limb detection step 345 also increases reliability, because false positives that may have occurred in unnatural regions have been eliminated. For example, the process couldn't determine a chest or groin area where the foot should be located.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method for visual image detection using a computer readable medium that converts a general computing device into a specific computing machine, comprising:
   scan an example image for later matching image purposes and run the visual image detection process to calculate hash values for the example image;
   input a new image for matching detection process;
   scan new image for shape configuration detection wherein the shapes orientation and distance relation to each other is utilized when the image has a predetermined requirement of the shape relationships;
   perform color detection in the feature descriptors for user determined colors and shades pre-selected from the color spectrum;
   eliminate background sections of the image without feature descriptors are eliminated from future scanning;
   eliminate curvature sections for curves on the edges of the feature descriptors where the noncompliant curvature sections of the features are eliminated;
   determine hash values for the remaining features using the fast algorithm combined with the sift algorithm and comparing those values with hash values of images from a host database that were calculated in the same fashion;
   select images that satisfy the user determined hash value similarity requirements.

2. The method according to claim 1, wherein the example image is a database of multiple example images.

3. The method according to claim 2, wherein the database comprises multiple images of nude body parts including breasts and genitalia.

4. The method according to claim 2, wherein the database comprises copyright protected images.

5. The method according to claim 1, wherein the input image is bilaterally filtered.

6. The method according to claim 1, wherein edge mapping has been performed.

7. The method according to claim 1, wherein the shape configuration detection is for facial shape configuration.

8. The method according to claim 1, wherein the color detection is skin-tone colors.

9. The method according to claim 1 further comprising detecting body limbs from the image following eliminating noncomplying curvature.

10. The method according to claim 9 further comprising eliminating non body limb area features from body part detection.

11. The method according to claim 1, wherein the hash value detection further comprising:
    using the fast algorithm to extract features including corner features from the image and eliminates other edge features from the image;
    using the sift algorithm which computes the extracted features from the fast algorithm;
    clustering the feature descriptors into a range value using the K-means clustering function;
    computing a unary feature for each descriptor;
    creating a square matrix with the descriptor values;
    selecting random projections from matrix that contains a bit hash value;

computing hash values and random projection values and serving into corresponding buckets.

12. The method according to claim 11, wherein the descriptor range is a 0 to 128 value.

13. The method according to claim 11, wherein the square matrix has a dimension of 128 ×128.

14. The method according to claim 11, wherein number of random projections selected is 20.

15. The method according to claim 11, wherein the random projections are chosen so that the maximum number of squares is selected with reduced collisions.

16. The method according to claim 11, wherein the random projection outputs a 36 bit hash value.

17. The method according to claim 11, the resulting hash value is a 36 ×20 value.

18. The method according to claim 11, wherein there are 20 buckets.

* * * * *